United States Patent
Pinarbasi (10) Patent No.: US 6,295,187 B1
(45) Date of Patent: Sep. 25, 2001

(54) SPIN VALVE SENSOR WITH STABLE ANTIPARALLEL PINNED LAYER STRUCTURE EXCHANGE COUPLED TO A NICKEL OXIDE PINNING LAYER

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,164

(22) Filed: Jun. 29, 1999

(51) Int. Cl.⁷ .................................................. G11B 5/30
(52) U.S. Cl. .................................... 360/324.11; 360/314
(58) Field of Search ...................................... 360/324–327

(56) References Cited

U.S. PATENT DOCUMENTS

| | | | |
|---|---|---|---|
| 5,508,866 | 4/1996 | Gill et al. | 360/113 |
| 5,549,978 | 8/1996 | Iwasaki et al. | 428/692 |
| 5,563,752 | 10/1996 | Komuro et al. | 360/113 |
| 5,688,380 | 11/1997 | Koike et al. | 204/192.2 |
| 5,701,222 | 12/1997 | Gill et al. | 360/113 |
| 5,701,223 | 12/1997 | Gill et al. | 360/113 |
| 6,117,569 | * 9/2000 | Lin | 360/113 |
| 6,127,053 | * 10/2000 | Lin | 360/113 |

FOREIGN PATENT DOCUMENTS

| | | | |
|---|---|---|---|
| 5-347013 | 12/1993 | (JP) | G11B/5/39 |
| 7-211956 | 8/1995 | (JP) | G11B/5/39 |
| 8-127864 | 5/1996 | (JP) | G11B/5/39 |
| 8-235540 | 9/1996 | (JP) | G11B/5/39 |
| 8-293108 | 11/1996 | (JP) | G11B/5/39 |
| 10-32119 | 2/1998 | (JP) | G11B/5/39 |
| WO 95/03604 | 2/1995 | (WO) | G11B/5/66 |

OTHER PUBLICATIONS

Hoshiya et al, "Giant magneoresistance of spin valve films with NiO antiferromagnetic films", *IEEE Translation Journal on Magnetics in Japan*, vol. 9, No. 6, pp 236–241.

"Spin valves using a bcc–FeCoNi alloy pinned layer", *Institute of Electronics, Information and Communications Engineers*, 1997, vol. 96, No. 486 (MR96 88–94), pp. 45–51.

Y. Hamakawa et al, "Spin Valve Heads Utilizing Antiferromagnetic NiO Layers", *IEEE Transactions on Magnetics*, vol. 32, No. 1, Jan. 1996, pp. 149–155.

K. Nakamoto et al, "Design and Read Performance of GMR Heads with NiO", *IEEE Transactions on Magnetics*, vol. 32, No. 5, Sep. 1996, pp. 3374–3379.

De-Hua Han et al, "NiFe/NiO bilayers with high exchange couling and low coercive fields", *J. App. Phys. 81* (8), Part 2, Apr. 15, 1997, pp. 4996–4998.

* cited by examiner

Primary Examiner—A. J. Heinz
(74) Attorney, Agent, or Firm—Gray Cary Ware & Freidenrich; Ervin F. Johnston (57) ABSTRACT

A spin valve sensor has a pinned layer structure that has a net positive stress induced uniaxial anisotropy that promotes a pinning of the pinned layer structure in a pinned direction for stabilizing the pinning of the pinned layer structure at high temperatures near to a blocking temperature of a pinning layer which is exchange coupled to the pinned layer.

32 Claims, 9 Drawing Sheets

FIG. 11
(ABS)

SPIN VALVE SENSOR WITH STABLE ANTIPARALLEL PINNED LAYER STRUCTURE EXCHANGE COUPLED TO A NICKEL OXIDE PINNING LAYER

BACKGROUND OF THE INVENTION

1. Field of the Invention

The present invention relates to a spin valve sensor with a stable antiparallel pinned layer structure exchange coupled to a nickel oxide pinning layer and, more particularly, to an antiparallel pinned layer structure which has at least first and second antiparallel pinned layers wherein at least one of the antiparallel pinned layers includes a thin film that has positive magnetostriction.

2. Description of the Related Art

A high performance read head employs a spin valve sensor for sensing magnetic fields on a moving magnetic medium, such as a rotating magnetic disk or a linearly moving magnetic tape. The sensor includes a nonmagnetic electrically conductive first spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) which is an exposed surface of the sensor that faces the magnetic medium. First and second leads are connected to the spin valve sensor for conducting a sense current therethrough. The magnetic moment of the free layer is free to rotate in positive and negative directions from a quiescent or bias point position in response to positive and negative magnetic fields from a moving magnetic medium. The quiescent position is the position of the magnetic moment of the free layer when the sense current is conducted through the sensor without magnetic field signals from a rotating magnetic disk. The quiescent position of the magnetic moment of the free layer is preferably parallel to the ABS. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current through the sensor and a magnetic coupling between the free and pinned layers are minimized. This thickness is less than the mean free path of electrons conducted through the sensor. With this arrangement, a portion of the conduction electrons are scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of $\cos \theta$, where $\theta$ is the angle between the magnetic moments of the pinned and free layers. This resistance, which changes due to changes in scattering of conduction electrons, is referred to in the art as magnetoresistance (MR). A spin valve sensor has a significantly higher magnetoresistive (MR) coefficient than an anisotropic magnetoresistive (AMR) sensor. For this reason it is sometimes referred to as a giant magnetoresistive (GMR) sensor. Magnetoresistive coefficient is dr/R where dr is the difference in resistance between minimum resistance, where the magnetic moments of the free and pinned layers are parallel, and maximum resistance, where the magnetic moments of the free and pinned layers are antiparallel, and R is the minimum resistance, where the magnetic moments of the free and pinned layers are parallel.

When a spin valve sensor employs a single pinned layer it is referred to as a simple spin valve. Another type of spin valve sensor is an antiparallel (AP) pinned spin valve sensor. The AP pinned spin valve sensor differs from the simple spin valve sensor in that an AP pinned structure has multiple thin film layers instead of a single pinned layer. The AP pinned structure has an AP coupling layer sandwiched between first and second ferromagnetic pinned layers. The first pinned layer has its magnetic moment oriented in a first direction by exchange coupling to the antiferromagnetic pinning layer. The second pinned layer is immediately adjacent to the spacer layer and is antiparallel coupled to the first pinned layer because of the minimal thickness (in the order of 8 Å) of the AP coupling film. Accordingly, the magnetic moment of the second pinned layer is oriented in a second direction that is antiparallel to the direction of the magnetic moment of the first pinned layer.

The AP pinned structure is preferred over the single pinned layer because the magnetic moments of the first and second pinned layers of the AP pinned structure subtractively combine to provide a net magnetic moment that is less than the magnetic moment of the single pinned layer. The direction of the net moment is determined by the thicker of the first and second pinned layers. A reduced net magnetic moment equates to a reduced demagnetization (demag) field from the AP pinned structure. Since the antiferromagnetic exchange coupling is inversely proportional to the net pinning moment, this increases exchange coupling between the first pinned layer and the pinning layer. The AP pinned spin valve sensor is described in commonly assigned U.S. Pat. No. 5,465,185 to Heim and Parkin which is incorporated by reference herein.

The first and second pinned layers of the AP pinned structure are typically made of cobalt (Co). Unfortunately, cobalt has high coercivity, high magnetostriction and low resistance. When the first and second pinned layers of the AP pinned structure are formed they are sputter deposited in the presence of a magnetic field that is oriented perpendicular to the ABS. This sets the easy axis (e.a.) of the pinned layers perpendicular to the ABS. During a subsequent making of the magnetic head, the AP pinned structure is subjected to magnetic fields that are directed parallel to the ABS. These fields can cause the magnetic moment of the first pinned layer to switch from a desirable first direction perpendicular to the ABS to an undesirable second direction which is not perpendicular to the ABS. The same occurs to the second pinned layer of the AP pinned structure. If the coercivity of the first pinned layer of the AP pinned structure is higher than the exchange coupling between the first pinned layer and the pinning layer the exchange coupling will not return the magnetic moment of the first pinned layer to its original direction. This ruins the read head. This problem can occur during operation of the magnetic head in a disk drive when a magnetic field stronger than the exchange field of the first pinned layer of the AP pinned structure is exerted on the read head.

Efforts continue to increase the MR coefficient (dr/R) of GMR heads. An increase in the MR coefficient equates to higher bit density (bits/square inch of the rotating magnetic disk) read by the read head. When these efforts are undertaken it is important that the coercivity ($H_C$) of the pinned layer next to the pinning layer not exceed the exchange coupling field therebetween.

SUMMARY OF THE INVENTION

The present invention provides a highly stabilized antiparallel (AP) pinned layer structure which is exchange coupled to a nickel oxide (NiO) pinning layer. At least one of the AP pinned layers includes a thin film composed of a material that has a positive magnetostriction. In an embodiment of the invention, where only one of the AP pinned layers has a thin film composed of a material having positive magnetostriction, the AP pinned layer structure is exchange coupled to the nickel oxide (NiO) pinning layer. With this arrangement the AP pinned layer that is exchange coupled to the nickel oxide (NiO) pinning layer has a stress induced uniaxial anisotropy which is oriented perpendicular to the surface planes of the layers of the spin valve sensor. This uniaxial anisotropy promotes a pinning of the magnetic moment of the AP pinned layer perpendicular to the planes of the layers caused by the exchange coupling of the AP pinned layer to the nickel oxide (NiO) pinning layer. The stress induced uniaxial anisotropy of the AP pinned layer is in the same direction as the orientation of the magnetic moment of the AP pinned layer due to the exchange coupling with the nickel oxide pinning layer. Accordingly, when the pinning strengths of the nickel oxide (NiO) pinning layer is degraded in a magnetic disk drive with operating temperatures as high as 150° C. the stress induced anisotropy, due to the positive magnetostriction of the film in the AP pinned layer exchange coupled to the nickel oxide (NiO) pinning layer, maintains the orientation of the magnetic moment of the AP pinned layer perpendicular to the planes of the layers of the spin valve sensor.

In my investigation I found that when the positive magnetostriction film of the AP pinned layer interfaces the AP coupling layer, which is typically ruthenium (Ru), the performance of the spin valve sensor is degraded. This has been overcome by providing the AP pinned layer with a thin film of cobalt (Co) or cobalt iron (CoFe) between the positive magnetostriction thin film and the ruthenium (Ru) AP coupling layer. I further found that when the positive magnetostriction thin film is a material other than nickel iron (NiFe) the performance of the spin valve sensor is degraded when the positive magnetostriction thin film interfaces the nickel oxide (NiO) pinning layer. This problem has been overcome by providing the AP pinned layer with a nickel iron (NiFe) thin film between the positive magnetostriction thin film and the nickel oxide (NiO) pinning layer.

In a preferred embodiment the second AP pinned layer, which interfaces the spacer layer, also includes a thin film layer that has positive magnetostriction. This further supports pinning of the first AP pinned layer by antiparallel exchange coupling between the first and second AP pinned layers. In the same manner as the first AP pinned layer the second AP pinned layer may include a thin film of cobalt (Co) or cobalt iron (CoFe) between the positive magnetostriction thin film and the AP coupling layer of ruthenium (Ru). I have further enhanced the performance of the spin valve sensor by providing the second AP pinned layer with a third thin film which distinguishes it from the first AP pinned layer. The second AP pinned layer may be provided with a thin film of cobalt (Co) or cobalt iron (CoFe) between the positive magnetostriction thin film and the copper (Cu) spacer layer. The preferred AP pinned layer structure includes all of the thin films, as described hereinabove, exchange coupled to a nickel oxide (NiO) pinning layer. However, in a broad aspect of the invention only one of the AP pinned layers has a positive magnetostriction thin film, with or without the other thin films, exchange coupled to pinning layers which may be composed of antiferromagnetic materials other than nickel oxide (NiO). The above arrangement may be applied to either a top or a bottom spin valve sensor wherein the pinning layer is at the bottom or at the top respectively of the spin valve sensor. Further, the present invention applies to a single pinned layer structure which includes a positive magnetostriction thin film and a thin film of cobalt (Co) or cobalt iron (CoFe) located between the positive magnetostriction thin film and the copper (Cu) spacer layer. This single pinned layer structure may further include a thin film of nickel iron (NiFe) between the positive magnetostriction thin film and the nickel oxide (NiO) pinning layer when the positive magnetostriction thin film is composed of a material other than nickel iron (NiFe).

An object of the present invention is to provide an antiparallel (AP) pinned layer structure which has a net positive stress induced uniaxial anisotropy that supplements a pinning field between the pinned layer structure and a pinning layer.

Another object is to provide a highly stable antiparallel pinned layer structure that is exchange coupled to a nickel oxide (NiO) pinning layer during operating temperatures of the AP pinned layer structure in a magnetic disk drive.

A further object is to provide one or both of the AP pinned layers of an AP pinned layer structure with a thin film composed of a positive magnetostriction material.

Other objects and attendant advantages of the invention will be appreciated upon reading the following description taken together with the accompanying drawings.

DESCRIPTION OF THE PREFERRED EMBODIMENTS

MAGNETIC DISK DRIVE

Figure 1:
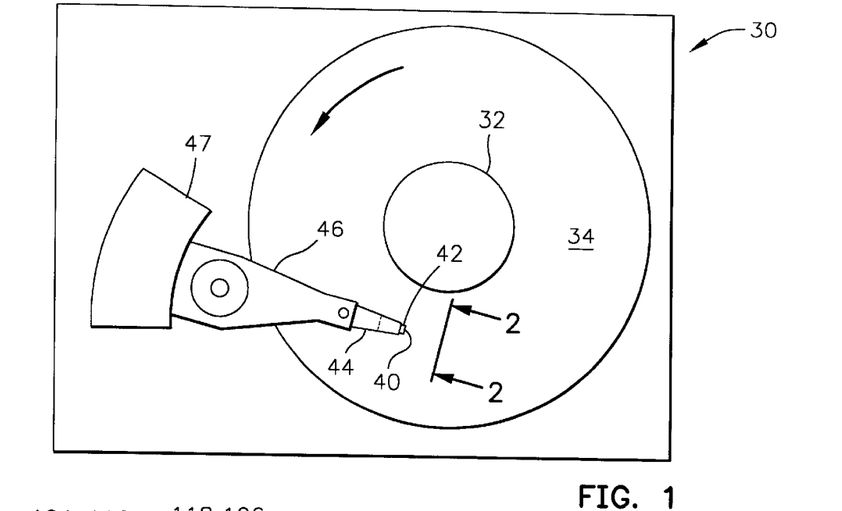
FIG. 1 is a plan view of an exemplary magnetic disk drive.
Figures 2, 3:
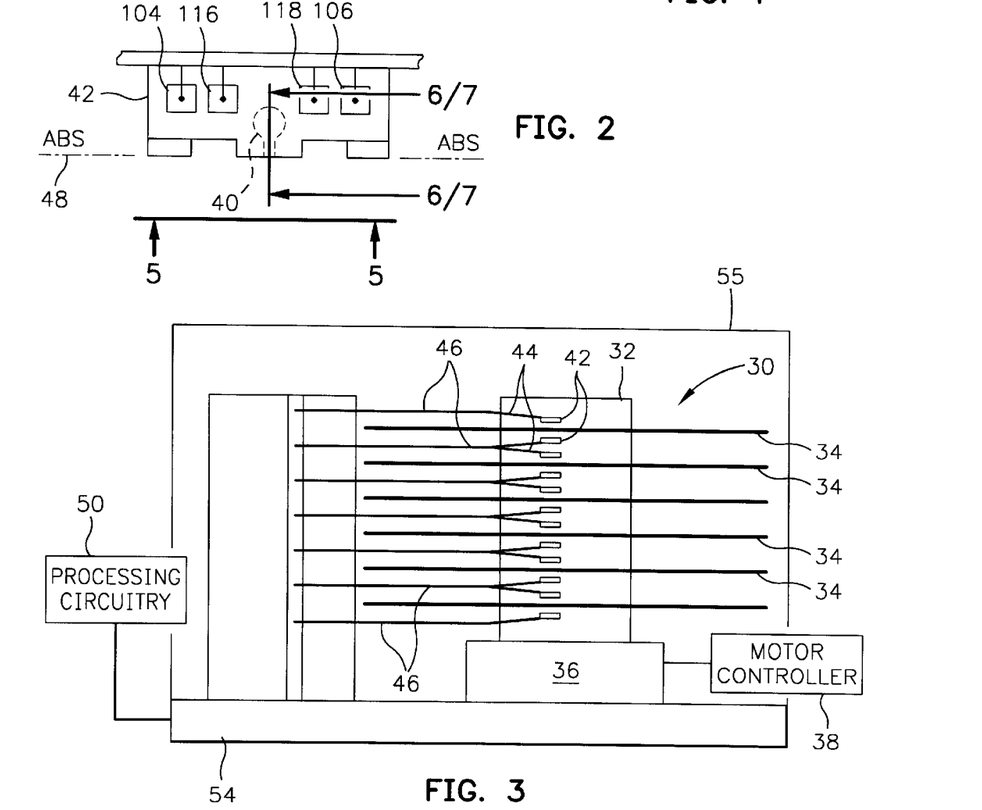
FIG. 2 is an end view of a slider with a magnetic head of the disk drive as seen in plane 2—2.
FIG. 3 is an elevation view of the magnetic disk drive wherein multiple disks and magnetic heads are employed.
Figure 4:
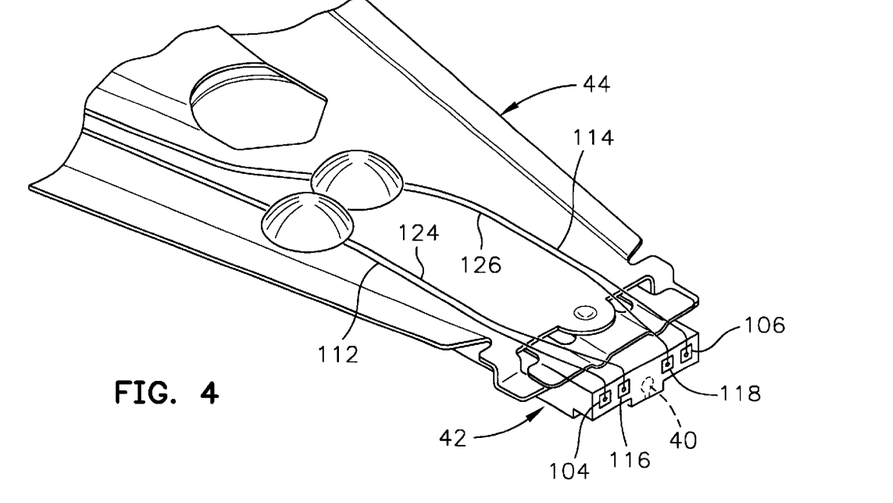
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle motor 32 that supports and rotates a magnetic disk 34. The spindle 32 is rotated by a motor 36 that is controlled by a motor controller 38. A slider 42 with a combined read and write magnetic head 40 is supported by a suspension 44 and actuator arm 46 which is selectively rotatably positioned by an actuator 47. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing, as shown in FIG. 3.

Figure 5:
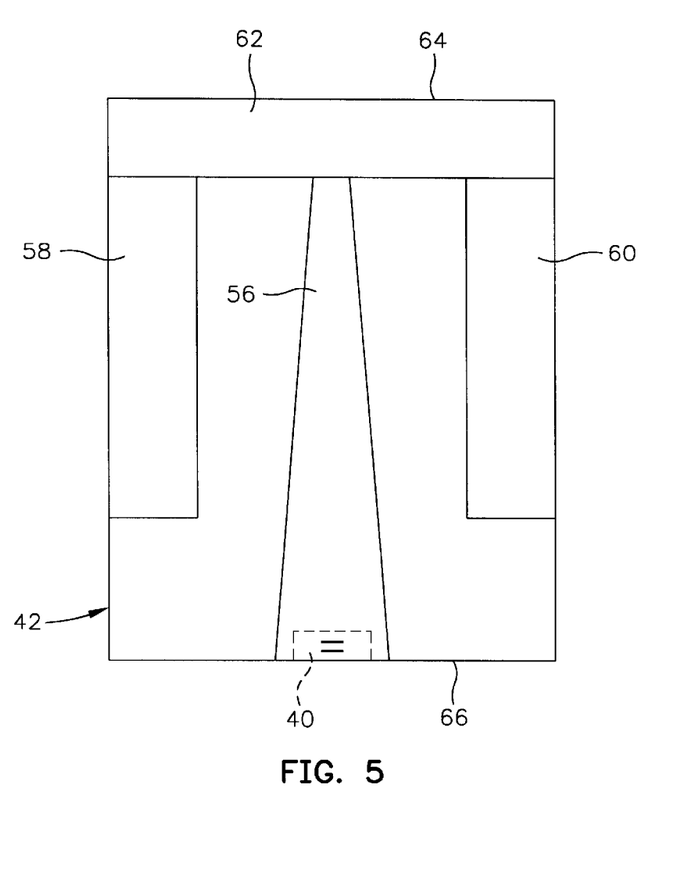
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
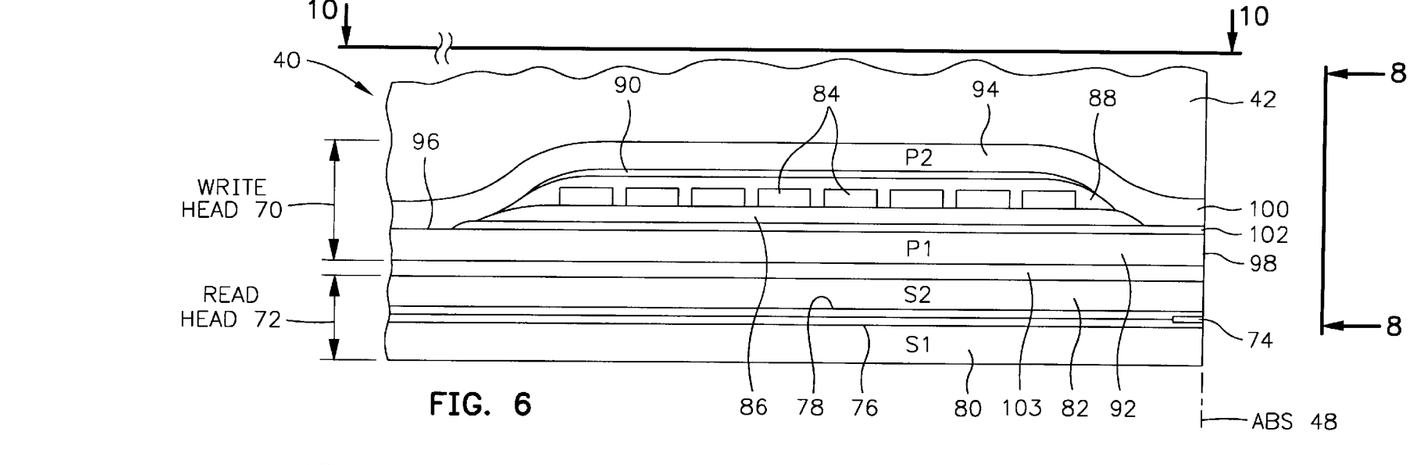
FIG. 6 is a partial view of the slider and a piggyback magnetic head as seen in plane 6—6 of FIG. 2.
Figure 8:
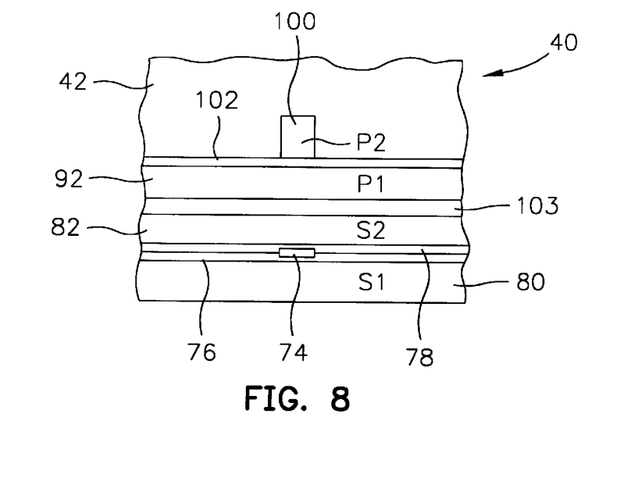
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 7:
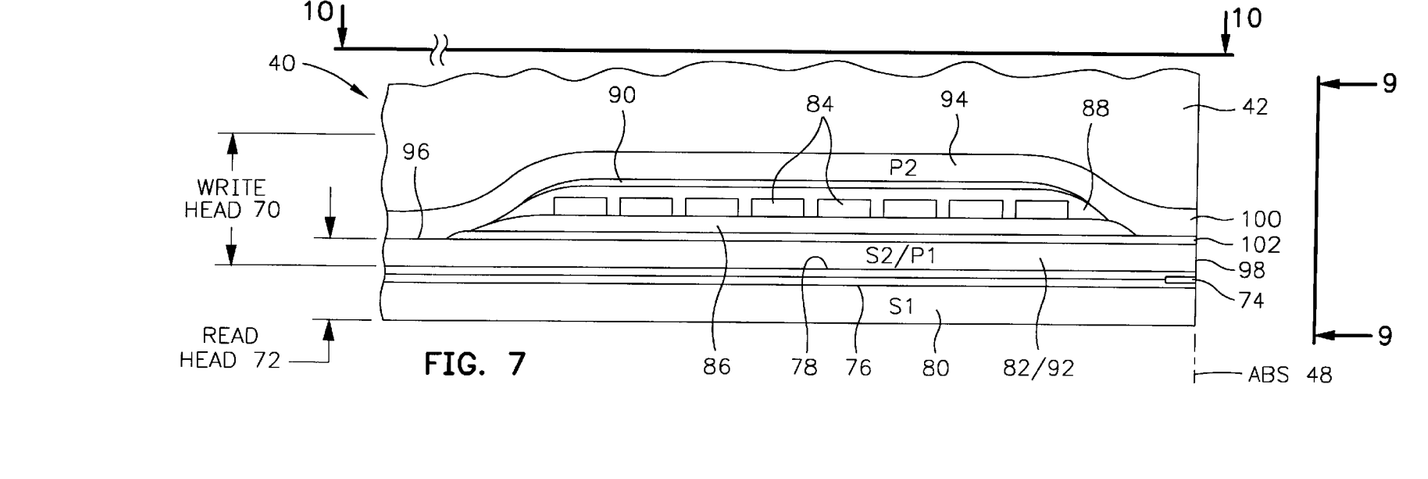
FIG. 7 is a partial view of the slider and a merged magnetic head as seen in plane 7—7 of FIG. 2.
Figure 9:
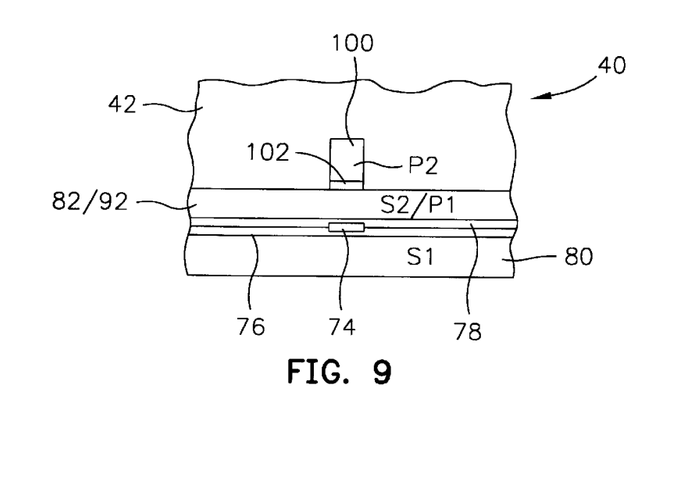
FIG. 9 is a partial ABS view of the slider taken along plane 9—9 of FIG. 7 to show the read and write elements of the merged magnetic head.
Figure 10:
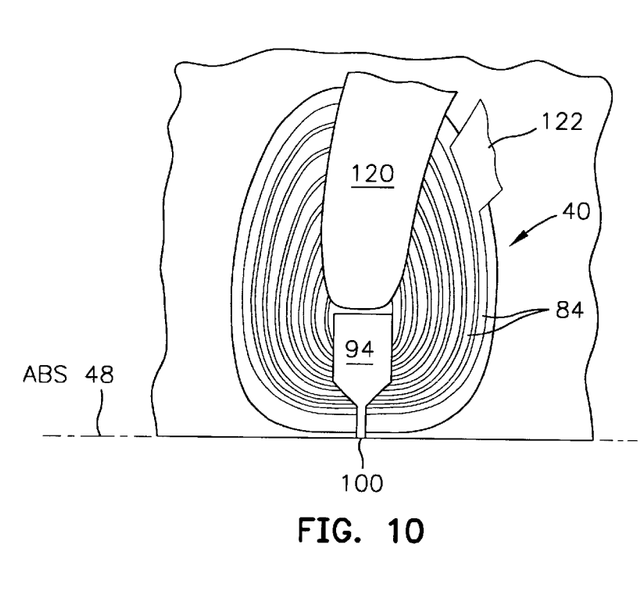
FIG. 10 is a view taken along plane 10—10 of FIGS. 6 or 7 with all material above the coil layer and leads removed.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
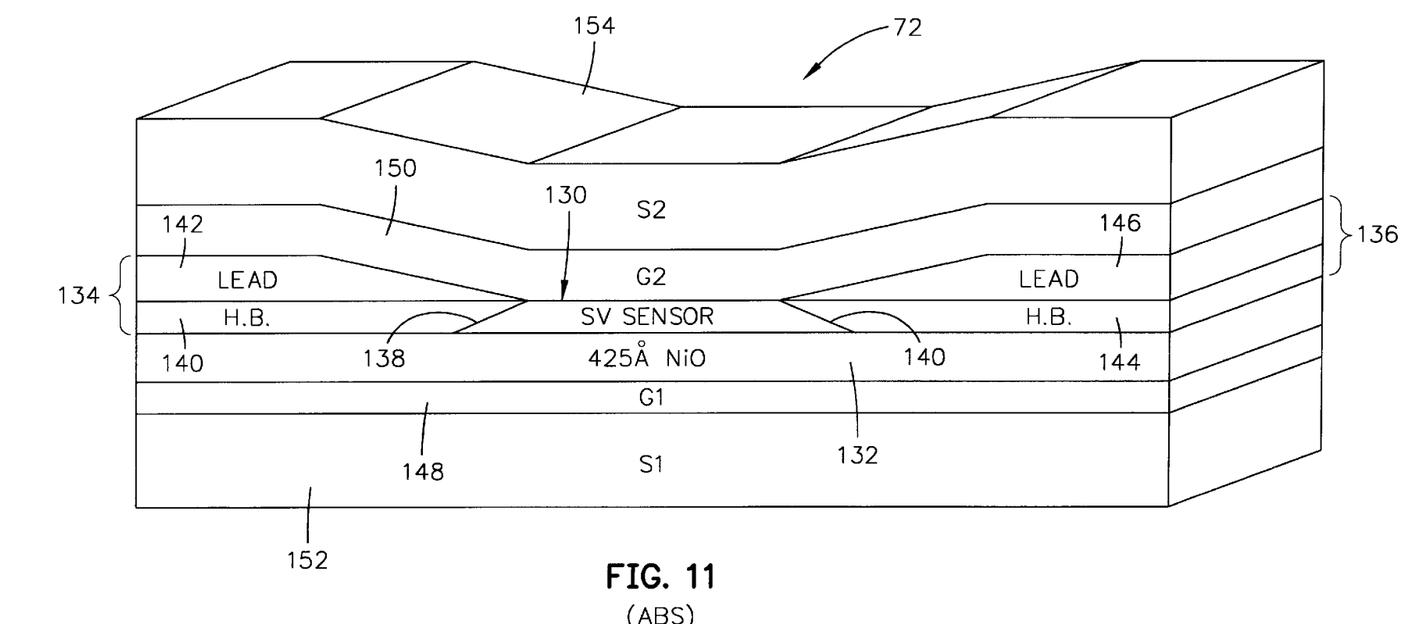
FIG. 11 is an isometric ABS illustration of a read head which employs an AP pinned spin valve (SV) sensor.

FIG. 11 is an isometric ABS illustration of the read head 72 shown in FIGS. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, has a magnetic moment that is pinned by the magnetic spins of the pinning layer 132. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

THE PRESENT INVENTION

Figure 12:
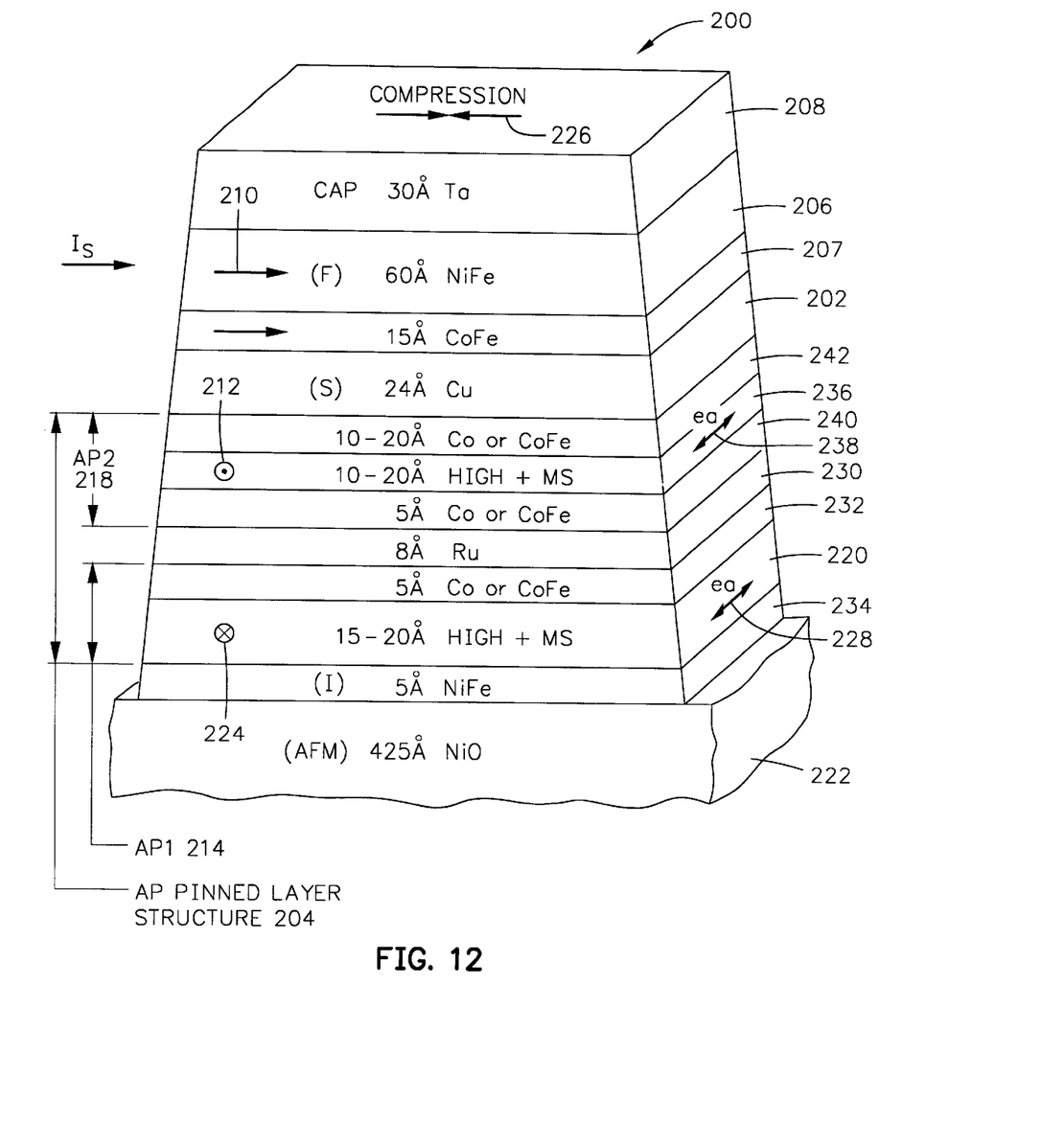
FIG. 12 is an ABS illustration of the present AP pinned structure in a bottom spin valve sensor.

FIG. 12 shows an ABS illustration of a preferred embodiment 200 of the present spin valve sensor. The spin valve sensor 200 includes a spacer layer (S) 202 which is located between an antiparallel (AP) pinned layer structure 204 and a free layer structure (F) which may include films 206 and 207. On top of the free layer 206 is a cap layer 208 for protecting the free layer from subsequent formations of layers of the read head. The free layer structure 206 and 207 has a magnetic moment 210 which is directed parallel to the ABS in a quiescent state (no signal field), either from right to left or from left to right, as shown in FIG. 12. The AP pinned layer structure 204 has a magnetic moment 212 which is pinned perpendicular to the ABS, either away from the ABS or toward the ABS, as shown in FIG. 12. When a signal field from a track of a rotating magnetic disk rotates the magnetic moment 210 upwardly the magnetic moments 210 and 212 become more antiparallel, which increases the resistance of the spin valve sensor and when the signal field from the track of a rotating magnetic disk rotates the magnetic moment 210 downwardly the magnetic moments 210 and 212 become more parallel, which decreases the resistance of the spin valve sensor. In a sense current $I_s$ circuit these resistance changes are manifested as potential changes which are processed as playback signals by the processing circuitry shown in FIG. 3.

The AP pinned layer structure 204 may include first and second AP pinned layers (AP1) and (AP2) 214 and 218. The first AP pinned layer 214 includes a first thin film 220 which is composed of a material that has a positive magnetostriction (+MS). The first AP pinned layer 214 is exchange coupled to an antiferromagnetic pinning layer 222, which is composed of nickel oxide, which pins a magnetic moment 224 of the positive magnetostriction first thin film 220 perpendicular to and away from the ABS, as shown in FIG. 12.

In prior art AP pinned layers, which do not employ a positive magnetostriction thin film 220, the pinning of the magnetic moment 224 is not stable when the read sensor reaches operating temperatures as high as 150° C. in a magnetic disk drive. While a blocking temperature of the nickel oxide (NiO) pinning layer 222 is 215°–225° C., there is a blocking temperature distribution where magnetic spins of the pinning layer are free to rotate below the blocking temperature. Blocking temperature is the temperature at which all of the magnetic spins of the pinned layer are no longer pinned by the pinning layer. Unfortunately, there is a percentage of the blocking temperature distribution that is at and below 150° C. which means that a percentage of the magnetic spins of the pinning layer are free to rotate at these temperatures. This causes the pinning strengths between the pinning layer 222 and the first AP pinned layer 214 to be degraded allowing extraneous fields to relocate the magnetic moment 224 in an orientation that is not perpendicular to the ABS. If the coercivity ($H_C$) of the first AP pinned layer 214 is greater than the pinning strength, the pinning layer 222 will not have sufficient pinning strength to bring the magnetic moment 224 back to its perpendicular orientation, as shown in FIG. 12.

By providing the first AP pinned layer 214 with the positive magnetostriction thin film 220 the first AP pinned layer 214 has a stress induced uniaxial anisotropy which supports the pinning of the magnetic moment 224 in its orientation shown in FIG. 12. This is made possible due to the fact that after lapping the magnetic head structure the layers of the spin valve sensor 200 are in compression parallel to the ABS. This is exemplified at 226 for the top cap layer 226 and is the same for the layers therebelow, including the AP pinned layer structure 204. Because of the compression, the positive magnetostriction of the thin film 220 causes the easy axis 228 of the positive magnetostriction thin film 220 to be perpendicular to the ABS. Accordingly, when the pinning layer 222 pins the magnetic moment 224 perpendicular to and away from the ABS there is a stress induced uniaxial anisotropy which is oriented in the same direction. If the pinning layer 222 pins the thin film layer 220 perpendicular to and toward the ABS the stress induced anisotropy would be in the same direction, namely perpendicular to and toward the ABS. The stress induced uniaxial anisotropy finds its orientation when the magnetic spins of the pinning layer 222 are reset by applying a magnetic field to the first AP pinned layer which orients the magnetic moment of the thin film 220 perpendicular to and away from the ABS, as shown in FIG. 12.

The AP pinned layer structure 214, 224 includes an antiparallel (AP) coupling layer 230 which is located between the first and second AP pinned layers 214 and 218. I found that when the positive magnetostriction thin film 220 interfaces the AP coupling layer 230, which is typically composed of ruthenium (Ru), that the performance of the spin valve sensor is degraded. I have overcome this problem by providing a thin film of cobalt (Co) or cobalt iron (CoFe) between the positive magnetostriction thin film 220 and the AP coupling layer 230. Further, I found that when the positive magnetostriction layer 220 interfaces the nickel oxide (NiO) pinning layer 222 that the performance of the spin valve sensor is degraded. I have overcome this problem by providing the first AP pinned layer 214 with a nickel iron (NiFe) thin film 234 which is located between the positive magnetostriction thin film 220 and the pinning layer 222.

In a preferred embodiment the second AP pinned layer 218 also includes a positive magnetostriction thin film 236. Because of the positive magnetostriction of the thin film 236 this thin film also has an easy axis 238 which is oriented perpendicular to the ABS. By antiparallel coupling between the first and second AP pinned layers 214 and 218 the magnetic moment 212 of the positive magnetostriction thin film 236 is oriented perpendicular to toward the ABS, as shown in FIG. 12. This causes a stress induced uniaxial anisotropy which is oriented in the same direction for supporting the orientation of the magnetic moment 212 perpendicular to and toward the ABS. It should be noted that because of antiparallel coupling between the first and second AP pinned layers 214 and 218 the stress induced uniaxial anisotropy of the second AP pinned layer 218 will additionally support the orientation of the magnetic moment 224 of the positive magnetostriction film 220 perpendicular to and away from the ABS. This is particularly important when the spin valve sensor reaches operating temperatures of the disk drive which reduces the pinning strength between the nickel oxide (NiO) pinning layer 222 and the positive magnetostriction thin film 220. Accordingly, the present AP pinned layer structure 224 is highly stabilized by employing a positive magnetostriction thin film in each of the first and second AP pinned layers 214 and 218.

For the same reason as explained for the first AP pinned layer 214 a thin film of cobalt (Co) or cobalt iron (CoFe) 240 is provided between the positive magnetostriction thin film 236 and the AP coupling layer 230 for improving the performance of the spin valve sensor. In a preferred embodiment the second AP pinned layer 218 includes a third thin film which differs from the thin film 234 employed in the first AP pinned layer 214. The thin film 242 in the second AP pinned layer is located between the positive magnetostriction thin film 236 and the copper (Cu) spacer layer 202. I found that the thin film 242 further increases the performance of the spin valve sensor. In a preferred embodiment the AP pinned layer 204 includes all of the thin films as described hereinabove.

Preferred thicknesses and materials for the layers and thin films are 425 Å of nickel oxide (NiO) for the pinning layer 222, 5 Å of nickel iron (NiFe) for the thin film 234, 15 Å to 20 Å of a positive magnetostriction material for the thin film 220, 5 Å of cobalt (Co) or cobalt iron (CoFe) for the thin film 232, 8 Å of ruthenium (Ru) for the AP coupling layer 230, 5 Å of cobalt (Co) or cobalt iron (CoFe), for the thin film 240 10–20 Å of a positive magnetostriction material for the thin film 236, 10–20 Å of cobalt (Co) or cobalt iron (CoFe) for the thin film 242, 24 Å of copper (Cu) for the spacer layer 202, 60 Å of nickel iron (NiFe) for the free layer film 206 and 15 Å of cobalt iron (CoFe) for the free layer film 207 and 30 Å of tantalum (Ta) for the cap 208. It should be understood that the magnetic moments of the thin films 234 and 232 will be oriented in the same direction as the magnetic moment 224, and that the magnetic moments of the thin films 240 and 242 will be oriented in the same direction as the magnetic moment 212. The thickness of the first AP pinned layer 214 may be greater or less than the thickness of the second AP pinned layer 218. It should be noted that the pinning layer 222 is below the other layers of the spin valve sensor. This means that the layers of the spin valve sensor are formed on top of and after the formation of the pinning layer 222. This type of spin valve sensor is known in the art as a bottom spin valve sensor since the pinning layer is located at the bottom of the sensor.

Figure 13:
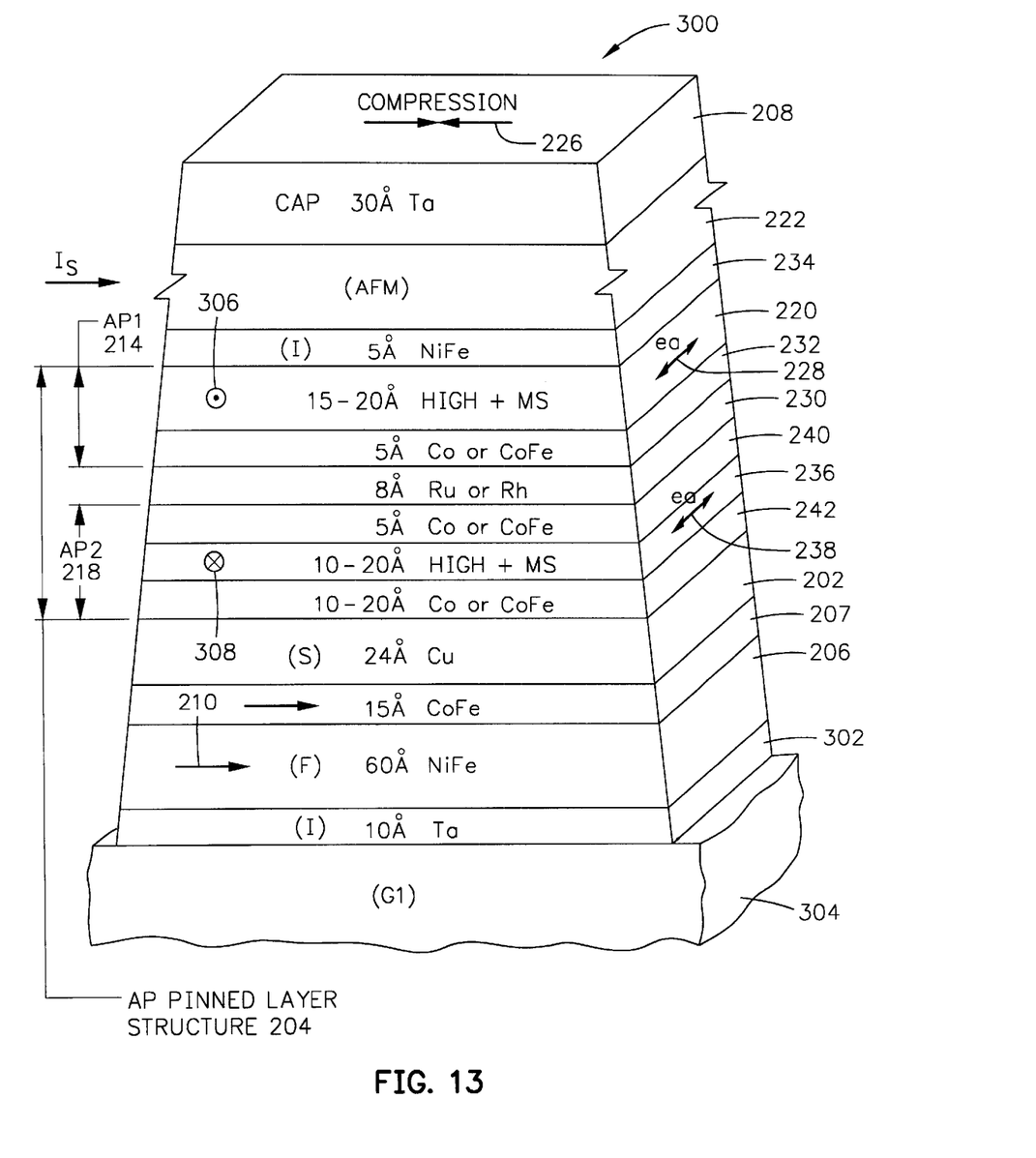
FIG. 13 is an ABS illustration of the present AP pinned layer structure in a top spin valve sensor.

FIG. 13 shows an ABS illustration of another preferred embodiment 300 of the present invention which is the same as the embodiment 200 shown in FIG. 12, except the AP pinned layer structure 204 is turned upside down, the spacer layer 202 and the free layer structure 206 and 207 are located below the AP pinned layer structure 204, a seed layer, such as a tantalum (Ta) layer 302 10 Å–30 Å thick, is provided between the free layer 206 and 207 and a first gap layer (G1) 304 and an antiferromagnetic (AFM) pinning layer 222, which may be nickel oxide (NiO), is located above the AP pinned layer structure 204. A further difference is that the magnetic moment 306 of the first AP pinned layer is perpendicular to and toward the ABS and the magnetic moment 308 of the second AP pinned layer is perpendicular and away from the ABS, as shown in FIG. 13. Because of the compression 226 the easy axis 228 and 238 of the positive magnetostriction thin films will be oriented perpendicular to the ABS so that when the magnetic spins of the pinning layer 222 are oriented perpendicular to and toward the ABS the positive magnetostriction thin films 220 will be a stress induced uniaxial anisotropy supporting the magnetic moment 306 in a direction perpendicular to and toward the ABS and the positive magnetostriction thin film 236 will have a stress induced uniaxial anisotropy that supports the orientation of the magnetic moment 308 in a direction perpendicular to and away from the ABS. The pinning layer 222 may be composed of an antiferromagnetic material other than nickel oxide (NiO), such as alpha iron oxide ($\alpha Fe_2O_3$), nickel manganese (NiMn), iron manganese (FeMn), platinum manganese (PtMn) or iridium manganese (IrMn). In a preferred embodiment, however, the pinning layer 222 is nickel oxide (NiO). Since the pinning layer 222 is located at the top of the spin valve sensor in FIG. 13, this type of spin valve sensor is known in the art as a top spin valve sensor.

Figure 14:
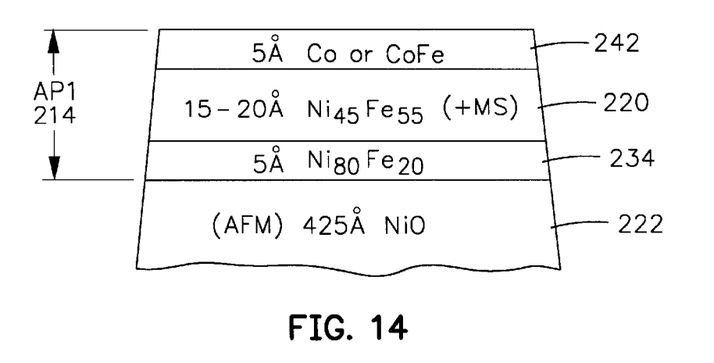
FIG. 14 is an ABS illustration of the first AP pinned layer with a positive magnetostriction thin film of $Ni_{45}Fe_{55}$.
Figure 15:
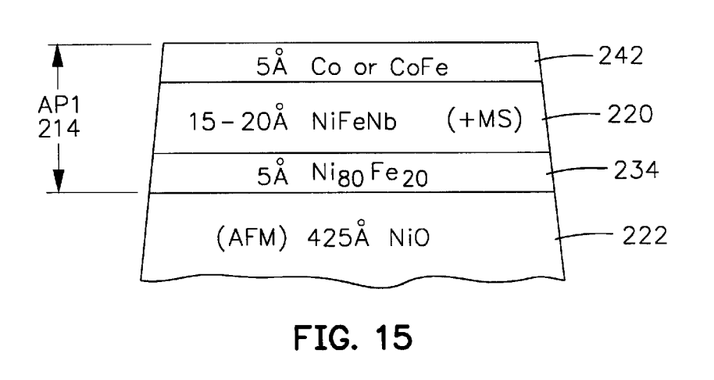
FIG. 15 is an ABS illustration of the first AP pinned layer with a positive magnctostriction thin film composed of nickel iron niobium (NiFeNb)
Figure 16:
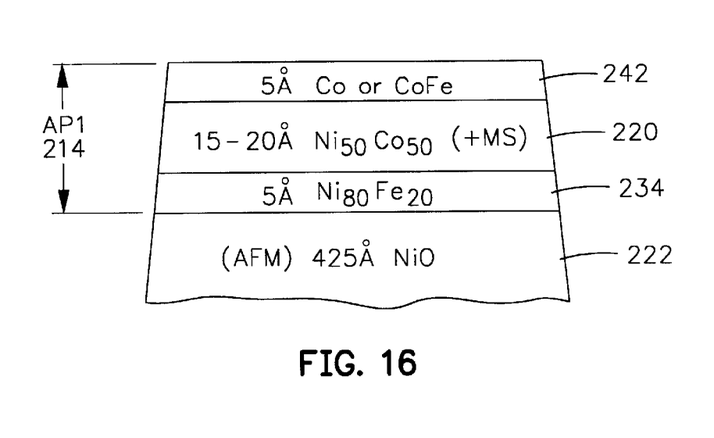
FIG. 16 is an ABS illustration of a first AP pinned layer with a positive magnetostriction thin film composed of nickel cobalt ($Ni_{50}Co_{50}$)

Various thin film layers for the first AP pinned layer 214 in either of the spin valves 200 or 300 in FIGS. 12 and 13 are shown in FIGS. 14, 15 and 16. In each of the embodiments shown in FIGS. 14, 15 and 16 a thin film layer of nickel iron ($Ni_{80}Fe_{20}$) 234 5 Å thick is employed between the positive magnetostriction thin film 220 and the nickel oxide (NiO) pinning layer 222. Further, in each of the embodiments shown in FIGS. 14, 15 and 16 a thin film of cobalt (Co) or cobalt iron (CoFe) is employed between the positive magnetostriction thin film 220 and the AP coupling layer 230 of ruthenium (Ru). The difference between the embodiments in FIGS. 14, 15 and 16 is the material used for the positive magnetostriction thin film 220. In the embodiment shown in FIG. 14 the positive magnetostriction thin film 220 is 15 Å to 20 Å of nickel iron ($Ni_{45}Fe_{55}$), the positive magnetostriction 220 in the embodiment in FIG. 15 is 15 Å to 20 Å of nickel iron niobium (NiFeNb) and the positive magnetostriction thin film 220 in FIG. 16 is 15 Å to 20 Å of nickel cobalt ($Ni_{50}Co_{50}$). Each of these materials for the thin film 220 has a positive magnetostriction. The nickel iron ($Ni_{45}Fe_{55}$) has a magnetostriction of $+5\times10^{-5}$, the nickel iron niobium (NiFeNb) has a magnetostriction of $+4\times10^{-5}$ and the nickel cobalt ($Ni_{50}Co_{50}$) has a magnetostriction of $+1-10\times10^{-5}$. As a comparison, nickel iron ($Ni_{80}Fe_{20}$) has substantially zero magnetostriction. In regard to the second AP pinned layer 218 in either of the embodiments 200 or 300 in FIGS. 12 and 13, the materials of the thin films may be identical as that shown for the first AP pinned layer 214 in FIGS. 14, 15 and 16, except the thin film of cobalt (Co) or cobalt iron (CoFe) 242 shown in FIGS. 12 and 13 is substituted for the nickel iron ($Ni_{80}Fe_{20}$) thin film 234 in FIGS. 14, 15 and 16.

It has been found that when the positive magnetostriction layer 220 interfaces the ruthenium (Ru) AP coupling layer 230 the strength of the antiparallel coupling between the first and second AP pinned layers 214 and 218 is degraded. I found that when the positive magnetostriction thin film 220 is cobalt iron (CoFe) it has a high coercivity ($H_C$) when it interfaces the nickel oxide (NiO) pinning layer 222. This coercivity ($H_C$) can easily exceed the pinning strength of the pinning layer 222 so that during operating temperatures the magnetic moment 224 of the thin film 220 can be switched from its orientation shown in FIGS. 12 and 13 and remain at the switched position even after termination of the operating temperature because the coercivity ($H_C$) of the thin film 220 exceeds the pinning strength of the pinning layer 222. However, if the material of the thin film 220 is nickel iron ($Ni_{45}Fe_{55}$) it can interface the nickel oxide (NiO) pinning layer 222 which obviates the need for the nickel iron (NiFe) thin film 234.

Figure 17:
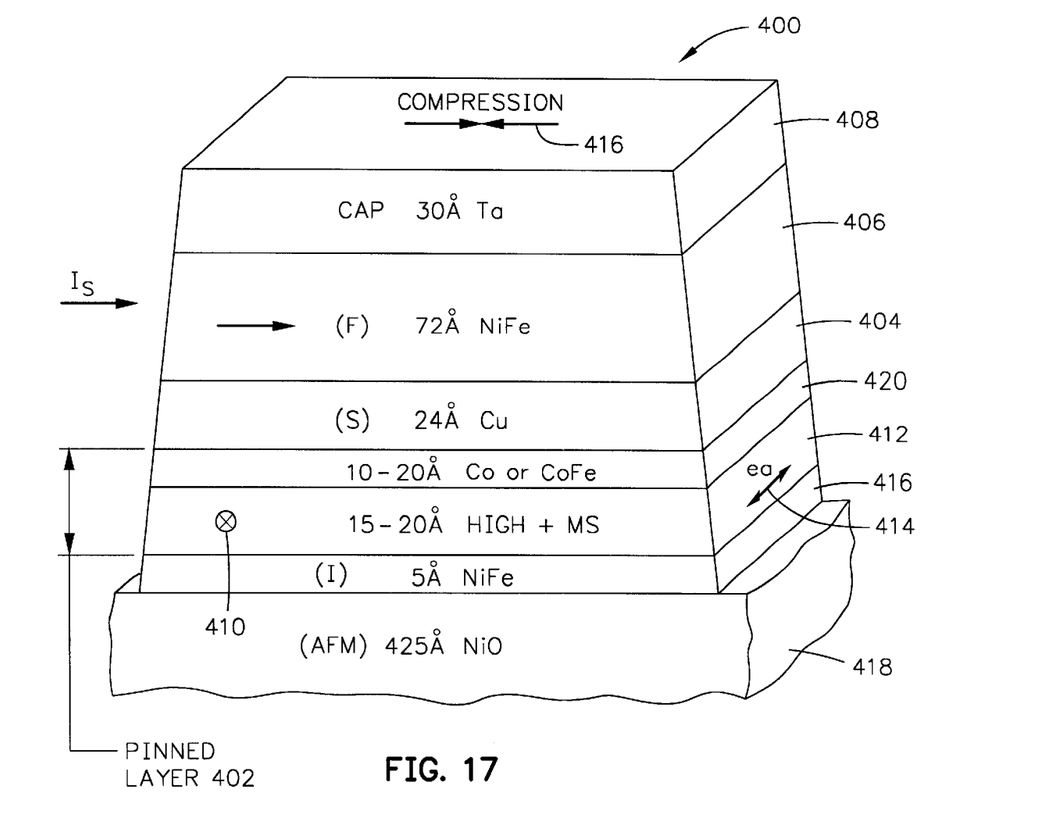
FIG. 17 is an ABS illustration of a single pinned layer structure having a positive magnetostriction thin film in a spin valve sensor.

FIG. 17 is an ABS illustration of another embodiment 400 of the spin valve sensor. This spin valve sensor differs from the embodiments 200 and 300 in that the pinned layer structure 402 is a single pinned layer structure instead of an AP pinned layer structure. A spacer layer 404 is located between the pinned layer structure 402 and the free layer 406. A cap layer 408 is located on the free layer 406 for its protection from subsequent processing steps. The AP pinned layer 402 has a magnetic moment 410 which is pinned perpendicular to and toward the ABS or away from the ABS, as shown in FIG. 17. The sense current $I_S$ is directed from left to right so as to support the pinning of the magnetic moment 410 in the direction shown.

The pinned layer structure 402 includes a positive magnetostriction (+MS) thin film 412 which has an easy axis 414 oriented perpendicular to the ABS because of the compression 416 which is manifested in the pinned layer structure 402. The pinned layer structure 402 includes a thin film 416 of nickel iron (NiFe) between the positive magnetostriction thin film 412 and a nickel oxide (NiO) pinning layer 418. I found this thin film 416 to be necessary when the positive magnetostriction thin film 412 is cobalt iron (CoFe) so as to reduce its coercivity ($H_C$) below the pinning strength of the pinning layer 418, as discussed hereinabove. Further, I have provided a thin film 420 of cobalt (Co) or cobalt iron (CoFe) between the positive magnetostriction thin film 412 and the copper (Cu) spacer layer 404 for enhancing the performance of the spin valve sensor. The thicknesses of the layers and thin films of the embodiment 400 are the same as the equivalent layers in the embodiments 200 and 300.

Clearly, other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

I claim:

1. A magnetic read head having an air bearing surface (ABS) comprising:
a spin valve sensor that includes:
a ferromagnetic free layer structure having a magnetic moment that is free to rotate from a first direction in response to signal fields from a moving magnetic medium;
a ferromagnetic antiparallel (AP) pinned layer structure;
an antiferromagnetic (AFM) pinning layer exchange coupled to the AP pinned layer structure for pinning a magnetic moment of the AP pinned layer structure in a second direction;
a nonmagnetic conductive spacer layer located between the free layer structure and the AP pinned layer structure;
the (AP) pinned layer structure including:
first and second antiparallel (AP) pinned layers;
an antiparallel (AP) coupling layer between the first and second AP pinned layers;
the first AP pinned layers including a first pinned film that has a positive magnetostriction and a second pinned film that is composed of cobalt (Co) or cobalt iron (CoFe); and
the second pinned film being located between and interfacing each of the first pinned film and the AP coupling layer.

2. A magnetic read head as claimed in claim 1 including:
nonmagnetic conductive first and second lead layers electrically connected to the spin valve sensor;
nonmagnetic nonconductive first and second read gap layers;
the spin valve sensor and the first and second lead layers being located between the first and second read gap layers; and
ferromagnetic first and second shield layers; and
the first and second read gap layers being located between the first and second shield layers.

3. A magnetic read head as claimed in claim 2 wherein the pinning layer is nickel oxide (NiO), the first pinned film is $Ni_{45}Fe_{55}$ and the first pinned film is interfaces the pinning layer.

4. A magnetic read as claimed in claim 2 including:
the pinning layer being nickel oxide (NiO); and
the first AP pinned layer including a third film of nickel iron which is located between and interfaces each of the pinning layer and the first pinned film.

5. A magnetic read head as claimed in claim 4 wherein the first pinned film is nickel iron niobium (NiFeNb).

6. A magnetic read head as claimed in claim 4 wherein the first pinned film is nickel cobalt ($Ni_{50}Co_{50}$).

7. A magnetic read head as claimed in claim 4 wherein the second AP pinned layer has a first pinned film with a positive magnetostriction and a second pinned film of cobalt (Co) or cobalt iron (CoFe) which is located between and interfaces the first pinned film and the spacer layer.

8. A magnetic read head as claimed in claim 7 wherein the first pinned film of the second AP pinned layer is nickel iron ($Ni_{45}Fe_{55}$).

9. A magnetic read head as claimed in claim 7 wherein the first pinned film of the second AP pinned layer is nickel iron niobium (NiFeNb).

10. A magnetic read head as claimed in claim 7 wherein the first pinned film of the second AP pinned layer is nickel cobalt $Ni_{50}Co_{50}$).

11. A magnetic read head as claimed in claim 7 including:
the second AP pinned layer including a third pinned film composed of cobalt (Co) or cobalt iron (CoFe); and
the third film of being located between and interfacing each of the AP coupling layer and the first pinned film of the second AP pinned layer.

12. A magnetic head assembly having a read head and a write head and an air bearing surface (ABS) comprising:
the write head including:
first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gaps portions; and
the read head including:
a spin valve sensor;
first and second lead layers electrically connected to the spin valve sensor;
nonmagnetic nonconductive first and second read gap layers;
the spin valve sensor and the first and second lead layers being located between the first and second read gap layers;
the spin valve sensor including:
a ferromagnetic free layer structure having a magnetic moment that is free to rotate from a first direction in response to signal fields from a moving magnetic medium;
a ferromagnetic antiparallel (AP) pinned layer structure;
an antiferromagnetic (AFM) pinning layer exchange coupled to the AP pinned layer structure for pinning a magnetic moment of the AP pinned layer structure in a second direction;
a nonmagnetic conductive spacer layer located between the free layer structure and the AP pinned layer structure;
the (AP) pinned layer structure including:
first and second antiparallel (AP) pinned layers;
an antiparallel (AP) coupling layer between the first and second AP pinned layers; and
the first AP pinned layers including a first pinned film that has a positive magnetostriction and a second pinned film that is composed of cobalt (Co) or cobalt iron (CoFe); and
the second pinned film being located between and interfacing each of the first pinned film and the AP coupling layer.

13. A magnetic head assembly as claimed in claim 12 including:
the read head further including:
a ferromagnetic second shield layer;
a nonmagnetic electrically insulative separation layer; and
the separation layer being located between the second shield layer and the first pole piece layer.

14. A magnetic head assembly as claimed in claim 12 including:
the pinning layer being nickel oxide (NiO); and
the first AP pinned layer including a third film of nickel iron which is located between and interfaces each of the pinning layer and the first pinned film.

15. A magnetic head assembly as claimed in claim 12 wherein the second AP pinned layer has a first pinned film with a positive magnetostriction and a second pinned film of cobalt (Co) or cobalt iron (CoFe) which is located between and interfaces the first pinned film and the spacer layer.

16. A magnetic head assembly as claimed in claim 15 including:
the second AP pinned layer including a third pinned film composed of cobalt (Co) or cobalt iron (CoFe); and
the third film of the second AP pinned layer being located between and interfacing each of the AP coupling layer and the first pinned film of the second AP pinned layer.

17. A magnetic head assembly as claimed in claim 16 including:
the pinning, layer being nickel oxide (NiO); and
the first AP pinned layer including a third film of nickel iron which is located between and interfaces each of the pinning layer and the first pinned film.

18. A magnetic head assembly as claimed in claim 17 wherein the first pinned film of each of the first and second AP pinned layers is nickel iron niobium (NiFeNb).

19. A magnetic head assembly as claimed in claim 17 wherein the first pinned film of each of the first and second AP pinned layers is nickel cobalt (NiCo).

20. A magnetic disk drive having at least one slider that has an air bearing surface (ABS), the slider supporting at least one magnetic head assembly that includes a read head and a write head, the disk drive comprising:
the write head including:
first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gaps portions; and
the read head having a spin valve sensor that includes:
a ferromagnetic free layer structure having a magnetic moment that is free to rotate from a first direction in response to signal fields from a moving magnetic medium;
a ferromagnetic antiparallel (AP) pinned layer structure;
an antiferromagnetic (AFM) pinning layer exchange coupled to the AP pinned layer structure for pinning a magnetic moment of the AP pinned layer structure in a second direction;
a nonmagnetic conductive spacer layer located between the free layer structure and the AP pinned layer structure;
the (AP) pinned layer structure including:
first and second antiparallel (AP) pinned layers;
an antiparallel (AP) coupling layer between the first and second AP pinned layers;
the first AP pinned layers including a first pinned film that has a positive magnetostriction and a second pinned film that is composed of cobalt (Co) or cobalt iron (CoFe); and
the second pinned film being located between and interfacing each of the first pinned film and the AP coupling layer;
the read head further including:
nonmagnetic conductive first and second lead layers electrically connected to the spin valve sensor;
nonmagnetic nonconductive first and second read gap layers;
the spin valve sensor and the first and second lead layers being located between the first and second read gap layers;
a ferromagnetic first shield layer; and
the first and second read gap layers being located between the first shield layer and the first pole piece layer; and
a housing;
a magnetic disk rotatably supported in the housing;
a support mounted in the housing for supporting the magnetic head assembly with its ABS facing the magnetic disk so that the magnetic head assembly is in a transducing relationship with the magnetic disk;
a spindle motor for rotating the magnetic disk;
an actuator connected to the support for moving the magnetic head assembly to multiple positions with respect to said magnetic disk; and
a processor connected to the magnetic head assembly to the means for rotating the magnetic disk and to the positioning means for exchanging signals with the magnetic head assembly, for controlling movement of the magnetic disk and for controlling the position of the magnetic head assembly.

21. A magnetic disk drive as claimed in claim 20 including:
the read head further including:
a ferromagnetic second shield layer;
a nonmagnetic electrically insulative separation layer; and
the separation layer being located between the second shield layer the first pole piece layer.

22. A magnetic disk drive as claimed in claim 20 wherein the pinning layer is nickel oxide (NiO), the first film is nickel iron ($Ni_{45}Fe_{55}$) and the first pinned film interfaces the pinning layer.

23. A magnetic disk drive as claimed in claim 20 including:
the pinning layer being nickel oxide (NiO); and
the first AP pinned layer including a third film of nickel iron which is located between and interfaces each of the pinning, layer and the first pinned film.

24. A magnetic disk drive as claimed in claim 23 wherein the second AP pinned layer has a first pinned film with a positive magnetostriction and a second pinned film of cobalt (Co) or cobalt iron (CoFe) which is located between and interfaces the first pinned film and the spacer layer.

25. A magnetic disk drive as claimed in claim 4 including:
the second AP pinned layers including a third pinned film composed of cobalt (Co) or cobalt iron (CoFe); and
the third film of the second AP pinned layer being located between and interfacing each of the AP coupling layer and the first pinned film of the second AP pinned layer.

26. A magnetic disk drive as claimed in claim 25 wherein the first pinned film of each of the first and second AP pinned layers is nickel iron niobium (NiFeNb).

27. A magnetic disk drive as claimed in claim 26 wherein the first pinned film of each of the first and second AP pinned layers is nickel cobalt (NiCo).

28. A magnetic read head having an air bearing surface (ABS) comprising:
a spin valve sensor that includes:
a ferromagnetic free layer structure having a magnetic moment that is free to rotate from a first direction in response to signal fields from a moving magnetic medium;
a ferromagnetic pinned layer structure;
an antiferromagnetic (AFM) pinning layer exchange coupled to the pinned layer structure for pinning a magnetic moment of the pinned layer structure in a second direction;
a nonmagnetic conductive spacer layer located between the free layer structure and the pinned layer structure; and
the first pinned film having a positive magnetostriction and the second pinned film being cobalt (Co) or cobalt iron (CoFe) and being located between the first pinned film and spacer layer.

29. A magnetic read head as claimed in claim 28 including:
nonmagnetic conductive first and second lead layers electrically connected to the spin valve sensor;
nonmagnetic nonconductive first and second read gap layers;
the spin valve sensor and the first and second lead layers being located between the first and second read gap layers; and
ferromagnetic first and second shield layers; and
the first and second read gap layers being located between the first and second shield layers.

30. A magnetic read head as claimed in claim 29 wherein the first pinned film is substantially nickel iron ($Ni_{45}Fe_{55}$).

31. A magnetic read head as claimed in claim 29 wherein the first pinned film is nickel iron niobium (NiFeNb).

32. A magnetic read head as claimed in claim 29 wherein the first pinned film is substantially nickel cobalt ($Ni_{50}Co_{50}$).

* * * * *